(12) United States Patent
Shibuya et al.

(10) Patent No.: US 9,488,790 B2
(45) Date of Patent: Nov. 8, 2016

(54) LENS ARRAY AND OPTICAL MODULE INCLUDING THE SAME

(71) Applicant: ENPLAS CORPORATION, Kawaguchi-shi (JP)

(72) Inventors: Kazutaka Shibuya, Kawaguchi (JP); Shimpei Morioka, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 26 days.

(21) Appl. No.: 14/376,371

(22) PCT Filed: Dec. 14, 2012

(86) PCT No.: PCT/JP2012/082458
§ 371 (c)(1),
(2) Date: Aug. 1, 2014

(87) PCT Pub. No.: WO2013/118390
PCT Pub. Date: Aug. 15, 2013

(65) Prior Publication Data
US 2015/0036985 A1 Feb. 5, 2015

(30) Foreign Application Priority Data
Feb. 10, 2012 (JP) ................................. 2012-027188

(51) Int. Cl.
G02B 6/43 (2006.01)
G02B 6/42 (2006.01)

(52) U.S. Cl.
CPC ............ G02B 6/425 (2013.01); G02B 6/4206 (2013.01); G02B 6/4214 (2013.01); G02B 6/4286 (2013.01)

(58) Field of Classification Search
None
See application file for complete search history.

(56) References Cited

U.S. PATENT DOCUMENTS

| 5,742,720 A | * | 4/1998 | Kobayashi | G02B 6/4249 385/65 |
| 5,907,162 A | * | 5/1999 | Maruyama | G02B 6/4204 257/100 |
| 6,243,508 B1 | * | 6/2001 | Jewell | G02B 6/4206 385/14 |

(Continued)

FOREIGN PATENT DOCUMENTS

| CN | 1761900 A | 4/2006 |
| JP | 2003-014987 A | 1/2003 |
| JP | 2004-198470 A | 7/2004 |
| JP | 2006-344915 A | 12/2006 |
| JP | 2008-116743 A | 5/2008 |
| JP | 2011-008014 A | 1/2011 |
| JP | 2011-039151 A | 2/2011 |
| JP | 2011-133807 A | 7/2011 |
| JP | 2011-248312 A | 12/2011 |
| WO | 2004/104666 A1 | 12/2004 |
| WO | 2011/077723 A1 | 6/2011 |
| WO | 2011/135877 A1 | 11/2011 |

OTHER PUBLICATIONS

English version of international preliminary report on patentability for PCT/JP2012/082458, dated Aug. 12, 2014.*
International Search Report (ISR) mailed Jan. 29, 2013, issued for International application No. PCT/JP2012/082458.
Supplementary European Search Report (SESR) dated Jun. 3, 2015, issued for corresponding European patent application No. EP12868279.

*Primary Examiner* — Mike Stahl
(74) *Attorney, Agent, or Firm* — Law Office of Katsuhiro Arai

(57) ABSTRACT

In an exemplary configuration, a lens array and a light module using the same include a first lens surface 11 and a second lens surface 12 formed into surface shapes such that by expanding the luminous flux diameter of light as the light travels from the first lens surface 11 toward the second lens surface 12, a light spot on the second lens surface 12 is larger in diameter than a light spot on the first lens surface 11, whereby the effects on optical performance by foreign objects and scratches on the lens surface can be mitigated, the criteria for the outward appearance of the lens surface can therefore be mitigated and the yield rate improved, and costs can be reduced.

9 Claims, 15 Drawing Sheets

(56) References Cited

U.S. PATENT DOCUMENTS

| | | | |
|---|---|---|---|
| 6,636,540 B2* | 10/2003 | Uebbing | H01S 5/02292 372/36 |
| 6,892,007 B2* | 5/2005 | Chen | G02B 6/4206 385/14 |
| 7,399,125 B1 | 7/2008 | Whaley et al. | |
| 2002/0136504 A1 | 9/2002 | Boscha | |
| 2004/0096152 A1 | 5/2004 | Nakama et al. | |
| 2005/0205771 A1 | 9/2005 | Sherrer et al. | |
| 2005/0218305 A1 | 10/2005 | Tsukamoto et al. | |
| 2008/0137519 A1 | 6/2008 | Ishigami | |
| 2008/0142815 A1 | 6/2008 | Morioka | |
| 2010/0329609 A1 | 12/2010 | Shimotsu | |
| 2011/0057204 A1 | 3/2011 | Morioka | |
| 2012/0263416 A1* | 10/2012 | Morioka | G02B 6/4214 385/33 |

* cited by examiner

LENS ARRAY AND OPTICAL MODULE INCLUDING THE SAME

This application is the U.S. National Phase under 35 U.S.C. §371 of International Application PCT/JP2012/082458, filed Dec. 14, 2012, which claims priorities to Japanese Patent Application No. 2012-027188, filed Feb. 10, 2012. The International Application was published under PCT Article 21(2) in a language other than English.

TECHNICAL FIELD

The present invention relates to a lens array and an optical module including the lens array. In particular, the present invention relates to a lens array suitable for optically coupling a photoelectric conversion element and an optical transmission body, and an optical module including the lens array.

BACKGROUND ART

In recent years, the application of so-called optical interconnection has become wide-spread as a technology for transmitting signals at high speed within a system device, between devices, or between optical modules. Here, optical interconnection refers to a technology in which optical components are handled as if they are electronic components, and are mounted on motherboards, circuit boards, and the like used in personal computers, vehicles, optical transceivers, and the like.

An optical module used in optical interconnection such as this serves various purposes, such as internal connection for media converters and switching hubs, and in-device and inter-device component connection for optical transceivers, medical equipment, testing devices, video systems, high-speed computer clusters, and the like.

As an optical component applied to this type of optical module, there is an increasing demand for a lens array in which a plurality of lenses having a small diameter are disposed in parallel, as a compactly structured component effective for actualizing multichannel optical communication (refer to, for example, Patent Literature 1).

Here, the lens array is conventionally configured such that a photoelectric conversion device including a plurality of light-emitting elements (such as a vertical cavity surface emitting laser [VCSEL]) or light-receiving elements (such as photodetectors) can be attached thereto, and a plurality of optical fibers serving as an optical transmission body can be attached thereto.

In a state in which the lens array is disposed between the photoelectric conversion device and the plurality of optical fibers in this way, the lens array is capable of performing multichannel optical transmission by optically coupling light emitted from each light-emitting element of the photoelectric conversion device with an end face of each optical fiber. The lens array is also capable of performing multichannel optical reception by optically coupling light emitted from the end face of each optical fiber with each light-receiving element.

Here, the lens array of this type configures a sub-assembly by being attached to a circuit board (chip-on-board [COB]) on which photoelectric conversion elements (light-emitting elements and light-receiving elements) serving as the photoelectric conversion device are mounted.

A sub-assembly such as this configures a full assembly by an optical connector housing the optical fibers, such as an MT connector, being attached thereto. At this time, when an active optical cable (AOC) is configured, the optical connector is attached in a non-detachable state. On the other hand, when an optical transceiver is configured, the optical connector is attached in a detachable state.

Patent Literature 1: Japanese Patent Laid-open Publication No. 2004-198470

DISCLOSURE OF INVENTION

Problem to be Solved by the Invention

In the lens array that is in the sub-assembly state, the lens faces on the photoelectric conversion device side are shielded from the outside by the structure of the sub-assembly. Therefore, adhesion of foreign matter, such as dust, and formation of scratches on the lens faces rarely occur. Conversely, the lens faces on the optical fiber side are not shielded from the outside because the optical connector is not yet attached. Therefore, adhesion of foreign matter and formation of scratches tend to occur during attachment of the optical connector and the like.

Because multichannel optical communication is required to be actualized using a compact lens array structure, the diameter dimension of each lens face has certain restrictions. Therefore, the area occupancy of foreign matter and scratches in relation to the lens face becomes unavoidably high, as a matter of course.

As a result, a problem has occurred in the past in which foreign matter and scratches on the lens faces cause significant decrease in coupling efficiency between the photoelectric conversion elements and the optical fibers.

Therefore, the present invention has been achieved in light of the above-described issues. An object of the present invention is to provide a lens array that is capable of reducing the effect foreign matter and scratches on a lens face have on optical performance, as well as relaxing outer appearance standards of the lens face, improving yield, and reducing cost, and an optical module including the lens array.

Means for Solving Problem

To achieve the above-described object, a lens array according to a first aspect of the present invention is a lens array that is disposed between a photoelectric conversion device and an optical transmission body, the photoelectric conversion device in which a plurality of photoelectric conversion elements are disposed in an array, the lens array capable of optically coupling the plurality of photoelectric conversion elements and the optical transmission body. The lens array includes: a plurality of first lens faces that are disposed on a first surface of a lens array main body on the photoelectric conversion device side, such as to be arrayed in a predetermined array direction corresponding with the plurality of photoelectric conversion elements, and through which light of each photoelectric conversion element that couples the plurality of photoelectric conversion elements and the optical transmission body passes; and a plurality of second lens faces that are disposed on a second surface of the lens array main body on the optical transmission body side, such as to be arrayed along the array direction, and through which the light passes. The first lens face or the second lens face is formed having a face shape that increases the light beam diameter of the light from the first lens face side towards the second lens face side, thereby increasing a spot diameter of the light on the second lens face to be larger than a spot diameter of the light on the first lens face.

In the invention according to the first aspect, the area occupancy of foreign matter/scratches in relation to a light spot on the second lens face can be reduced. Therefore, although the diameter dimension of the second lens face is restricted, the effect foreign matter/scratches on the second lens face have on coupling efficiency can be effectively reduced.

In addition, a lens array according to a second aspect of the present invention is the lens array according to the first aspect in which, further, the photoelectric conversion element is a light-emitting element. The first lens face is formed into a convex lens face or a planar lens face that converges the light emitted from the light-emitting element with a weaker refractive power than that for collimation, or a concave lens face that disperses the light of the light-emitting element.

In the invention according to the second aspect, when the light from the light-emitting elements are coupled with the optical transmission body, a light beam that widens in diameter from the first lens face side towards the second lens face side can be obtained with certainty. Therefore, the effect foreign matter/scratches on the second lens face have on the coupling efficiency of light to be coupled with the optical transmission body can be reduced with certainty.

Furthermore, a lens array according to a third aspect of the present invention is the lens array according to the first or second aspect in which, further, the second surface is disposed perpendicularly to the first surface. A reflective surface is disposed between the first lens faces and the second lens faces, the reflective surface reflecting the light that has entered from either the first lens face side or the second lens face side towards the other of the first lens face side or the second lens face side.

In the invention according to the third aspect, the effect foreign matter/scratches on the second lens face have on coupling efficiency can be effectively reduced in a configuration suitable for enabling the optical transmission body to extract light (transmission light) emitted from light-emitting elements mounted on a substrate from a direction parallel to the substrate, or enabling a light-receiving element mounted on a substrate to receive light (reception light) that is parallel to the substrate and emitted from the optical transmission body.

Still further, a lens array according to a fourth aspect of the present invention is the lens array according to the third aspect in which, further, the photoelectric conversion device is that in which at least one light-receiving element is disposed as the photoelectric conversion element, the light-receiving element receiving monitor light for monitoring the light emitted from at least one of the plurality of light-emitting elements. The lens array further includes: at least one third lens face that is disposed on the first surface and emits the monitor light that has entered from the inner side of the lens array main body towards the light-receiving element; and an optical control unit that is disposed on an optical path between the reflective surface and the second lens faces in the lens array main body, on which the light of each light-emitting element that has been reflected by the reflective surface towards the second lens face side is incident, and that performs control such that the incident light of each light-emitting element is reflected at a predetermined reflection factor and advanced towards the third lens face side, and transmitted at a predetermined transmission factor and advanced towards the second lens face side, and at this time, reflects the light of at least one of the plurality of light-emitting elements as the monitor light.

In the invention according to the fourth aspect, the effect foreign matter/scratches on the second lens face have on coupling efficiency can be effectively reduced in a configuration suitable for adjustment of the output of light of the light-emitting elements.

In addition, a lens array according to a fifth aspect of the present invention is the lens array according to the first or second aspect in which, further, the second surface is disposed opposing the first surface. The optical axis of the first lens face and the optical axis of the second lens face are disposed on a same line.

In the invention according to the fifth aspect, the effect foreign matter/scratches on the second lens face have on coupling efficiency can be effectively reduced in a configuration in which the second lens faces are disposed behind the first lens faces.

Furthermore, an optical module according to a sixth aspect of the present invention includes the lens array according to any one of the first to fifth aspects and the photoelectric conversion device according to the first, second, or fourth aspect.

In the invention according to the sixth aspect, the effect foreign matter/scratches on the second lens face have on coupling efficiency can be effectively reduced.

Effect of the Invention

In the present invention, the effect foreign matter/scratches on a lens face have on optical performance can be reduced, and in addition, outer appearance standards of the lens face can be relaxed, yield can be improved, and cost can be reduced.

BEST MODE(S) FOR CARRYING OUT THE INVENTION

First Embodiment

A lens array and an optical module including the lens array according to a first embodiment of the present invention will hereinafter be described with reference to FIG. 1 to FIG. 11.

Figure 1:
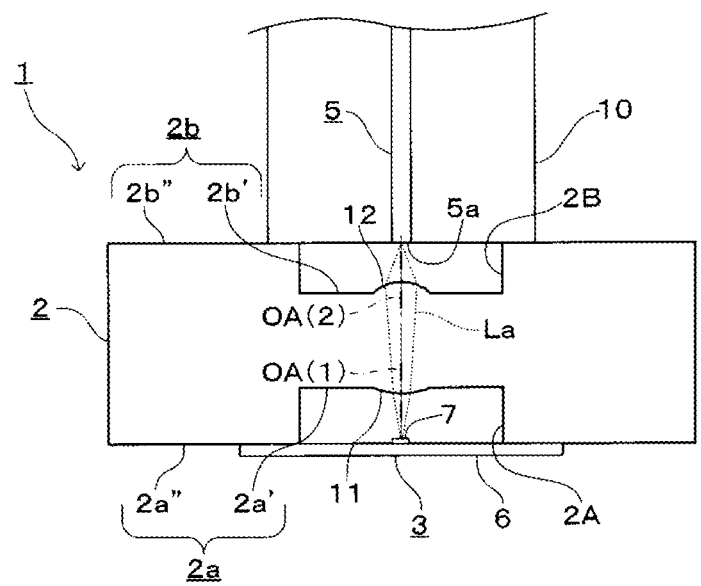
FIG. 1 An overall configuration diagram of a lens array and an optical module including the lens array according to a first embodiment of the present invention FIG. 2 A bottom view of the lens array shown in FIG. 1
Figure 2:
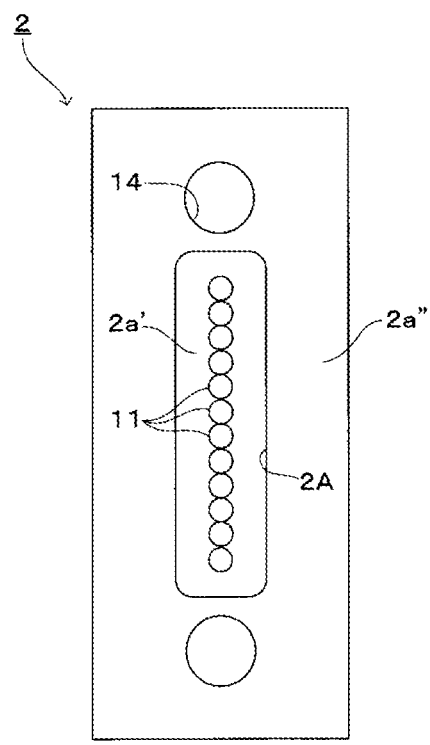
Figure 3:
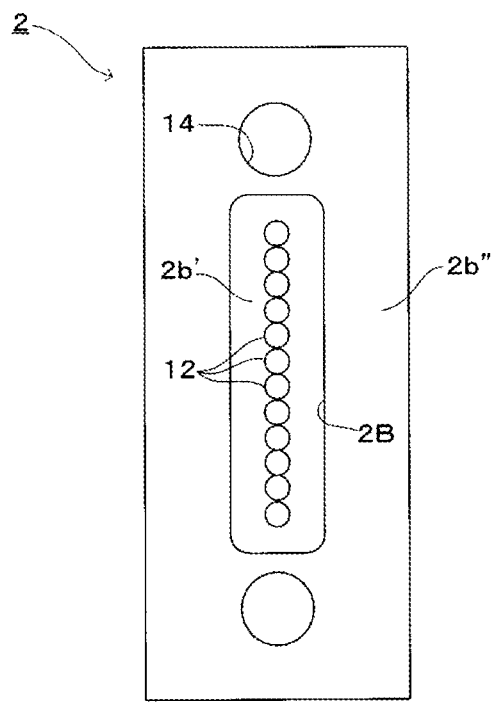
FIG. 3 A planar view of the lens array shown in FIG. 1

FIG. 1 is an overall configuration diagram of an overview of a sub-assembly 1 serving as the optical module according to the first embodiment, together with a vertical cross-sectional view of a lens array 2 according to the first embodiment. In addition, FIG. 2 is a bottom view of the lens array 2 shown in FIG. 1. Furthermore, FIG. 3 is a planar view of the lens array 2 shown in FIG. 1.

As shown in FIG. 1, the lens array 2 according to the first embodiment is disposed between a photoelectric conversion device 3 and optical fibers 5.

Here, the photoelectric conversion device 3 has a plurality of light-emitting elements 7 on a surface of a semiconductor substrate 6 facing the lens array 2, the light emitting-elements 7 emitting laser light La in a direction perpendicular to this surface (upward direction in FIG. 1). The light-emitting elements 7 configure the above-described vertical cavity surface emitting laser (VCSEL). In FIG. 1, the light-emitting elements 7 are formed in an array along a direction perpendicular to the surface of the paper on which FIG. 1 is printed. For example, the photoelectric conversion device 3 such as this is disposed opposing the lens array 2 in a state in which the semiconductor substrate 6 is in contact with the lens array 2. In addition, for example, the photoelectric conversion device 3 is attached to the lens array 2 by a known fixing means (not shown), such as a clamp spring, thereby configuring the sub-assembly 1 together with the lens array 2.

In addition, the same number of optical fibers 5 according to the first embodiment as the number of light-emitting elements 7 are arranged. The optical fibers 5 are disposed in an array along the direction perpendicular to the surface of the paper on which FIG. 1 is printed in FIG. 1, at the same pitch as the light-emitting elements 7. The optical fibers 5 are, for example, multi-mode optical fibers 5 that have the same dimensions as one another. A portion of each optical fiber 5 on an end face 5a side is held within a multi-core integrated optical connector 10, such as the above-described MT connector. For example, the optical fibers 5 such as these are attached to the lens array 2 by a known fixing means (such as a clamp spring; not shown) in a state in which the end face of the optical connector 10 on the lens array 2 side is in contact with the lens array 2.

The lens array 2 optically couples each light-emitting element 7 with the end face 5a of each optical fiber 5 in a state in which the lens array 2 is disposed between the photoelectric conversion device 3 and the optical fibers 5 such as those described above.

The lens array 2 will be described in further detail. As shown in FIG. 1, the lens array 2 (lens array main body) is composed of a light transmitting material (for example, a resin material such as polyetherimide) and has a substantially planar outer shape.

A lower end surface 2a of the lens array 2 such as that described above functions as a first surface to which the photoelectric conversion device 3 is attached. As shown in FIG. 1 and FIG. 2, a plurality (12 lens faces) of first lens faces 11 having a circular planar shape are formed on the lower end surface 2a. The number of first lens faces 11 is the same as the number of light-emitting elements 7. Here, as shown in FIG. 1 and FIG. 2, a section 2a' of the lower end surface 2a that has a substantially rectangular planar shape and is in a predetermined area in the center of the lower end surface 2a is formed into a recessed plane (referred to, hereinafter, as a lens formation surface 2a') that recesses further upwards than a peripheral section 2a" with a counterbore section 2A therebetween. The plurality of first lens faces 11 are formed on the lens formation surface 2a' such as this. However, the lens formation surface 2a' is formed in parallel with the peripheral section 2a". In addition, the first lens faces 11 are disposed in an array in a predetermined array direction (the direction perpendicular to the surface of the paper on which FIG. 1 is printed in FIG. 1, and a vertical direction in FIG. 2) corresponding with the light-emitting elements 7. Furthermore, the first lens faces 11 are formed having the same dimensions as one another, and are formed at the same pitch as the light-emitting elements 7. The first lens faces 11 that are adjacent to each other in the array direction may be formed in an adjacent state in which the respective circumferential edge portions are in contact with each other. In addition, as shown in FIG. 1, an optical axis OA(1) of each first lens face 11 preferably matches a center axis of the laser light La emitted from each light-emitting element 7 corresponding with each first lens face 11. More preferably, the optical axis OA(1) of each first lens face 11 is perpendicular with the lower end surface 2a.

On the other hand, an upper end surface 2b of the lens array 2 that opposes the lower end surface 2a functions as a second surface to which the plurality of optical fibers 5 are attached. As shown in FIG. 1 and FIG. 3, a plurality of second lens faces 12 having a circular planar shape are formed on the upper end surface 2b. The number of second lens faces 12 is the same as the number of first lens faces 11. Here, as shown in FIG. 1 and FIG. 3, a section 2b' of the upper end surface 2b that has a substantially rectangular planar shape and is in a predetermined area in the center of the upper end surface 2b is formed into a recessed plane (referred to, hereinafter, as a lens formation surface 2b') that recesses further downwards in FIG. 1 than a peripheral section 2b" that surrounds the section 2b' with a counterbore section 2B therebetween. The plurality of second lens faces 12 are formed on the lens formation surface 2b' such as this. However, the lens formation surface 2b' is formed in parallel with the peripheral section 2b". In addition, the plurality of second lens faces 12 are disposed in an array in the same direction as the array direction of the end faces 5a of the optical fibers 5, or in other words, the array direction of the first lens faces 11. Furthermore, the second lens faces 12 are formed having the same dimensions as one another, and are formed at the same pitch as the first lens faces 11. The second lens faces 12 that are adjacent to each other in the array direction may be formed in an adjacent state in which the respective circumferential edge portions are in contact with each other. In addition, an optical axis OA(2) of each second lens face 12 is preferably positioned on the same axis as the center axis of the end face 5a of each optical fiber 5 corresponding with each second lens face 12. More preferably, the optical axis OA(2) of each second lens face 12 is perpendicular with the upper end surface 2b. Furthermore, the optical axis OA(2) of each second lens face 12 is disposed on the same line as the optical axis OA(1) of each first lens face 11 corresponding with each second lens face 12.

According to the first embodiment, each lens face 11 increases the light beam diameter of the laser light La from the first lens face 11 side towards the second lens face 12 side, thereby forming the planar shape of the spot diameter (diameter of the outer circumferential edge of the projection area of the laser light La; the same applies hereafter) of the laser light La on the second lens face 12 to be larger than the spot diameter of the laser light La on the first lens face 11. Specifically, each first lens face 11 is formed into a convex lens face having a weaker refractive power (in other words, a greater radius of curvature) than a collimate lens face. The convex lens face may be spherical or aspherical. However, the face shape of the first lens face 11 is designed to allow the spot (projection area) of the laser light La on the second lens face 12 to fit within the effective diameter of the second lens face 12. In designing such a face shape, it goes without saying that the distance between the first lens face 11 and the second lens face 12 (lens thickness), the distance between the light-emitting element 7 and the first lens face 11, the beam dispersion angle (in other words, NA) of the laser light La emitted from the light-emitting element 7, and the like are taken into consideration, in addition to the effective diameter of the second lens face 12.

As shown in FIG. 1, the laser light La emitted from each light-emitting element 7 corresponding with each first lens face 11 is incident on each first lens face 11 such as this. Each first lens face 11 advances the incident laser light La of each light-emitting element 7 into the lens array 2. At this time, the laser light La of each light-emitting element 7 is converged with a weaker refractive power than that for collimation because of the face shape of each first lens face 11. As a result, the light beam diameter of the laser light La of each light-emitting element 7 increases from the first lens face 11 side towards the second lens face 12 side.

On the other hand, the second lens face 12 is formed into a spherical or aspherical convex lens face. As shown in FIG. 1, the laser light La of each light-emitting element that has been converged by each first lens face 11 corresponding with each second lens face 12 is incident on each second lens face 12. At this time, the spot diameter of the laser light La on the second lens face 12 is larger than the spot diameter of the laser light La on the first lens face 11. Each second lens face 12 then converges the incident laser light La of each light-emitting element 7 and emits the laser light La towards the end face 5a of each optical fiber 5 corresponding with each second lens face 12.

In this way, each light-emitting element 7 and the end face 5a of each optical fiber 5 are optically coupled by first lens face 11 and the second lens face 12.

In the above-described configuration, the area occupancy of foreign matter/scratches in relation to the light spot on the second lens face 12 can be reduced in a configuration in which the second lens face 12 is disposed behind the first lens face 11. As a result, while the diameter dimension of the second lens face 12 is restricted, the effect foreign matter/scratches on the second lens face 12 has on coupling efficiency can be effectively reduced.

In addition, as shown in FIG. 2, a pair of through holes 14 that pass through the lower end surface 2a and the upper end surface 2b are bored in the peripheral section 2a" of the lower end surface 2a, on both outer side positions in relation to the lens formation surface 2a' in the array direction of the first lens faces 11. The through holes 14 are used for mechanical positioning when the photoelectric conversion device 3 and the optical fibers 5 are attached, as a result of pins (not shown) respectively provided on the photoelectric conversion device 3 and the optical connector 10 being inserted therein. However, pins may be provided instead of the through holes 14, and through holes or bottomed-holes may be provided on the photoelectric conversion device 3 side and the optical connector 10 side.

According to the first embodiment, various variation examples such as those below may be applied to the basic configuration shown in FIG. 1 to FIG. 3.

First Variation Example

Figure 4:
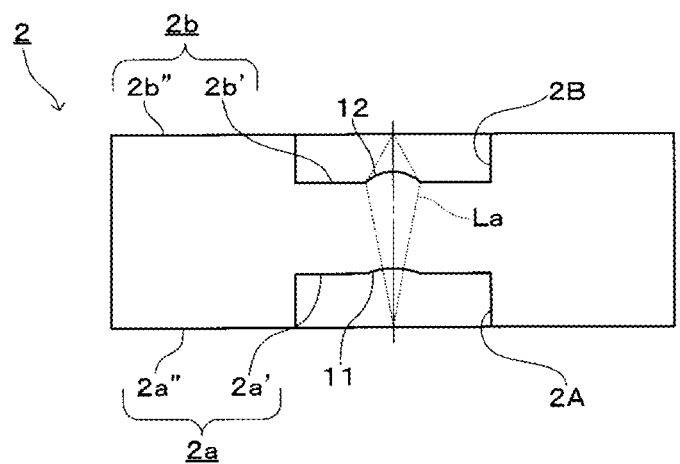
FIG. 4 A vertical cross-sectional view of a lens array in a first variation example according to the first embodiment FIG. 5 A vertical cross-sectional view of a lens array in a second variation example according to the first embodiment FIG. 6 A bottom view of FIG. 5

For example, as shown in FIG. 4, each first lens face 11 may be a spherical or aspherical concave lens face. In this instance, the laser light La of each light-emitting element 7 that has entered each first lens face 11 is dispersed by each first lens face 11. As a result, the light beam diameter increases as the laser light La of each light-emitting element 7 advances towards the second lens face 12. Therefore, in a manner similar to that in the basic configuration, the spot diameter of the laser light La on each second lens face 12 can be made larger than the spot diameter of the laser light La on each first lens face 11 in the first variation example as well. As a result, the effect foreign matter/scratches on the second lens face 12 has on coupling efficiency can be effectively reduced.

Second Variation Example

Figure 5:
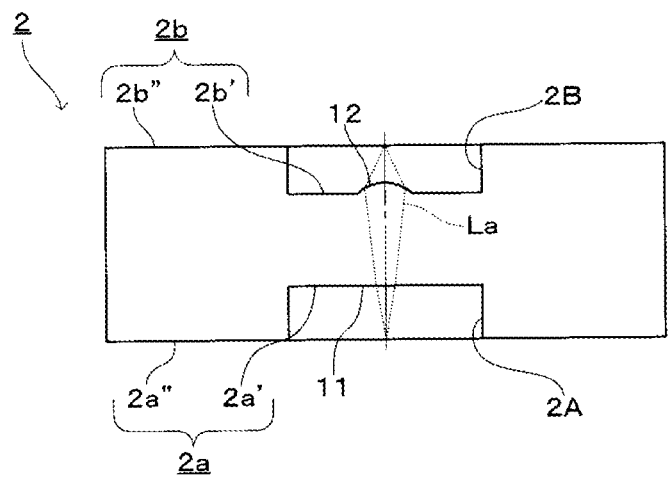
Figure 6:
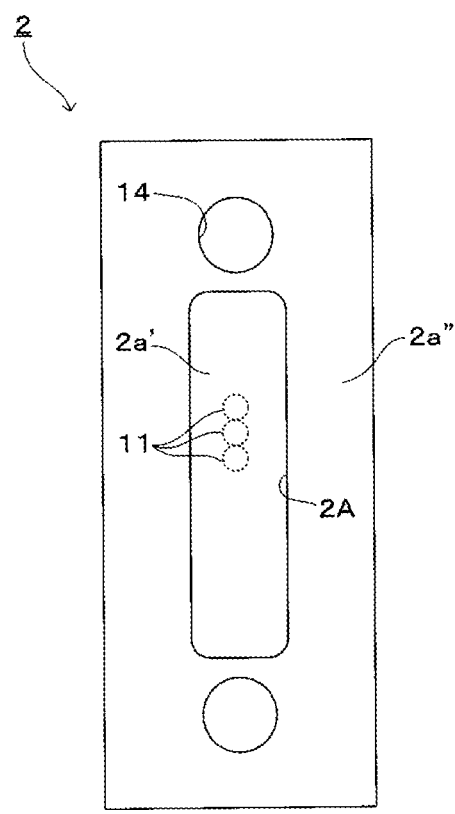

In addition, as shown in the vertical cross-sectional view in FIG. 5 and the bottom view in FIG. 6, each first lens face 11 may be formed into a planar lens face. In this instance, the first lens faces 11 may not be able to be differentiated in terms of outer appearance. However, in terms of design, the first lens faces 11 are clearly differentiated by respective areas (broken line sections in FIG. 6).

In the second variation example, the laser light La of each light-emitting element 7 that has entered each first lens face 11 is converged by each first lens face 11 with a weaker refractive power than that for collimation. As a result, the light beam diameter is increased as the laser light La of each light-emitting element 7 advances towards the second lens face 12 side. Therefore, working effects similar to those of the basic configuration can be achieved in the second variation example as well.

Third Variation Example

Figure 7:
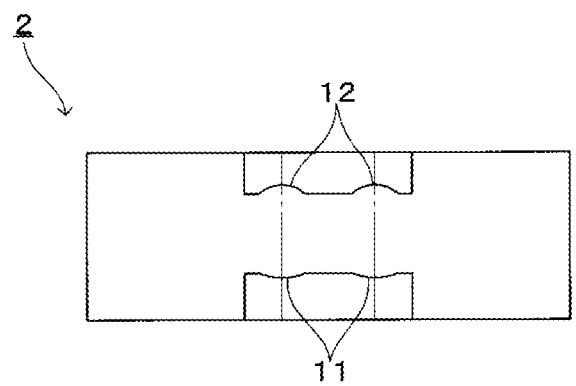
FIG. 7 A vertical cross-sectional view of a lens array in a third variation example according to the first embodiment FIG. 8 A bottom view of FIG. 7
Figure 8:
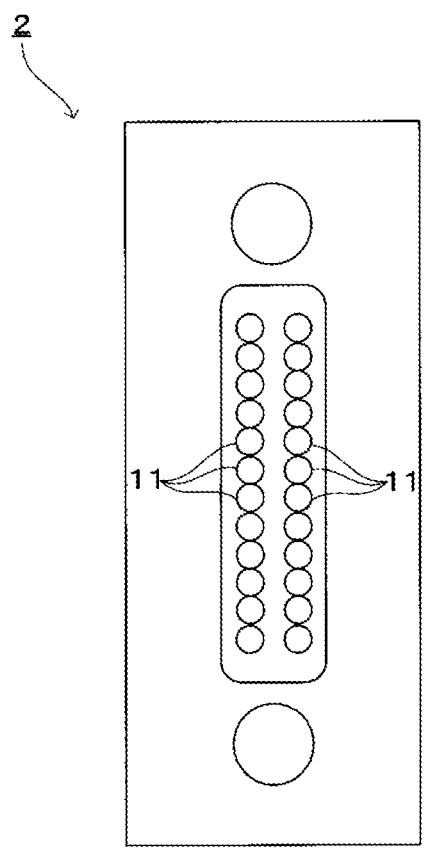
Figure 9:
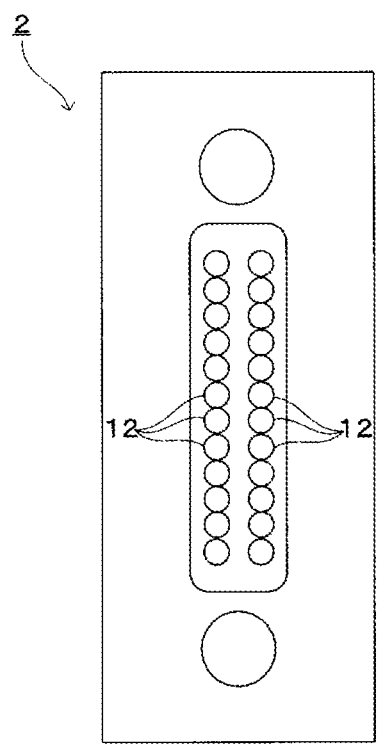
FIG. 9 A planar view of FIG. 7

In addition, as shown in the vertical cross-sectional view in FIG. 7, the bottom view in FIG. 8, and the planar view in FIG. 9, the number of first lens faces 11 and the number of second lens faces 12 in the basic configuration may be increased. Specifically, in the third variation example, two rows of 12 first lens faces 11 and two rows of 12 second lens faces 12 are disposed, thereby actualizing 24-channel optical communication.

Fourth Variation Example

Figure 10:
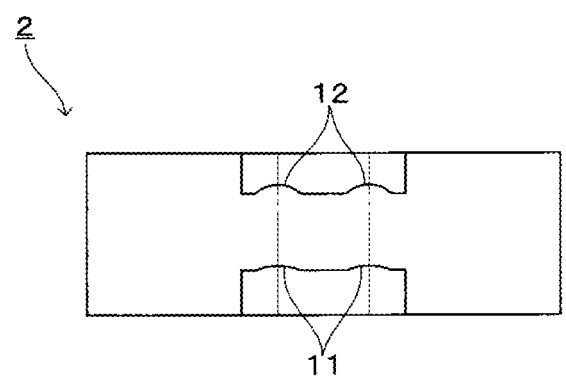
FIG. 10 A vertical cross-sectional view of a lens array in a fourth variation example according to the first embodiment FIG. 11 A vertical cross-sectional view of a lens array in a fifth variation example according to the first embodiment FIG. 12 An overall configuration diagram of a lens array and an optical module including the lens array according to a second embodiment of the present invention FIG. 13 A bottom view of the lens array shown in FIG. 12

Furthermore, as shown in FIG. 10, the number of first lens faces 11 and the number of second lens faces 12 in the first variation example may be increased to two rows of 12 first lens faces 11 and two rows of 12 second lens faces 12 (24 each).

Fifth Variation Example

Figure 11:
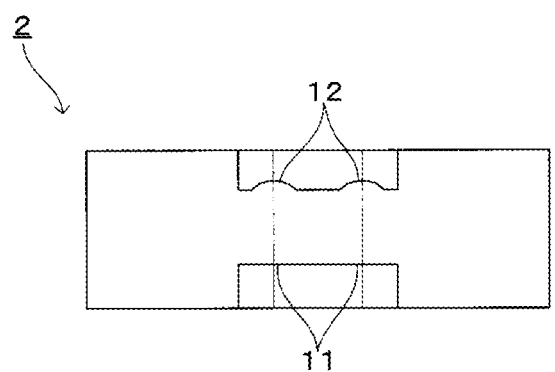

Still further, as shown in FIG. 11, the number of first lens faces 11 and the number of second lens faces 12 in the second variation example may be increased to two rows of 12 first lens faces 11 and two rows of 12 second lens faces 12.

Second Embodiment

Next, a lens array and an optical module including the lens array according to a second embodiment of the present invention will be described with reference to FIG. 12 to FIG. 22.

Sections of which the basic configuration is the same or similar to that according to the first embodiment are described using the same reference numbers.

Figure 12:
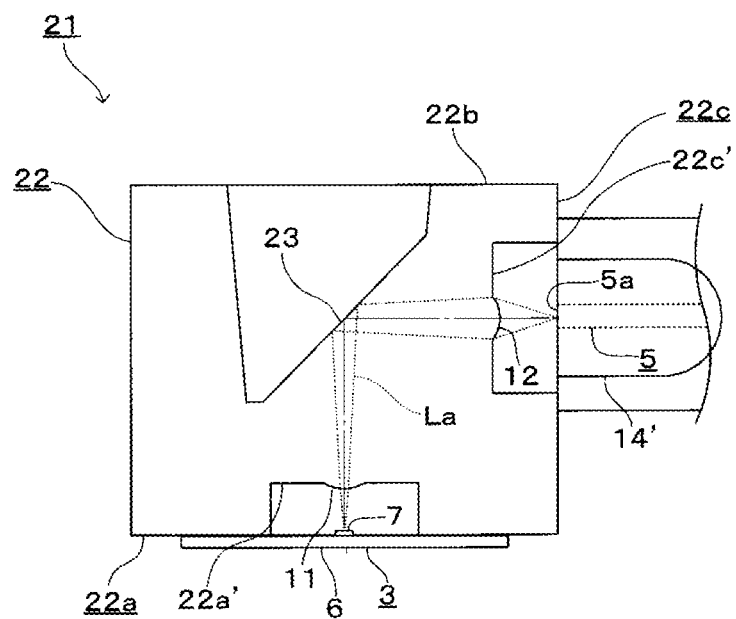
Figure 13:
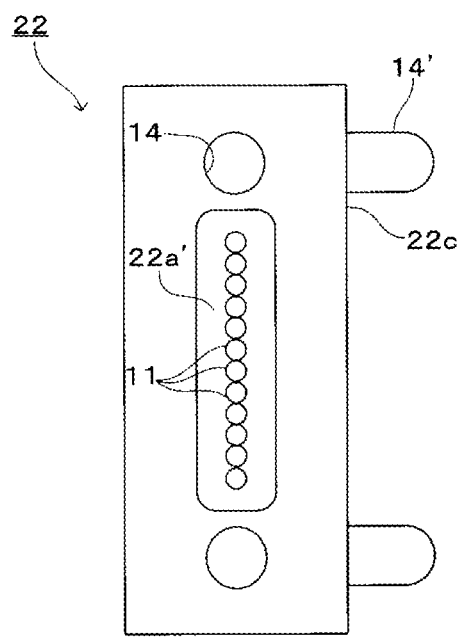
Figure 14:
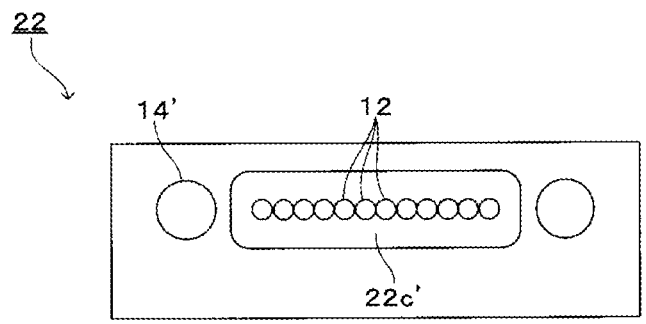
FIG. 14 A right-side view of the lens array shown in FIG. 12

FIG. 12 is an overall configuration diagram of an overview of a sub-assembly 21 according to the second embodiment, together with a vertical cross-sectional view of a lens array 22. In addition, FIG. 13 is a bottom view of the lens array 22 shown in FIG. 12. Furthermore, FIG. 14 is a right-side view of the lens array 22 shown in FIG. 12.

As shown in FIG. 12, the lens array 22 according to the second embodiment is disposed between the photoelectric conversion device 3 and the optical fibers 5 in a manner similar to that according to the first embodiment. In addition, the basic configurations of the photoelectric conversion device 3 and the optical fibers 5 are similar to those according to the first embodiment.

However, the sub-assembly 21 according to the second embodiment is configured so that the laser light La emitted from each light-emitting element 7 mounted on the substrate 6 is extracted from a direction parallel to the substrate 6 at the end face 5a of each optical fiber 5.

A specific configuration is as follows.

In other words, as shown in FIG. 12, the lens array 22 (lens array main body) is composed of a light-transmitting material (for example, a resin material such as polyetherimide) and has a substantially rectangular parallelepiped outer shape.

A lower end surface 22a of the lens array 22 such as this functions as a first surface to which the photoelectric conversion device 3 is attached. As shown in FIG. 12 and FIG. 13, a plurality (12 lens faces) of first lens faces 11 having a circular planar shape are disposed in an array along the light-emitting elements 7 on the lower end surface 2a. The number of first lens faces 11 is the same as the number of light-emitting elements 7. In a manner similar to that according to the first embodiment, the first lens faces 11 are formed on a lens formation surface 22a' that is a recessed plane formed in a predetermined area in the center of the lower end surface 22a.

On the other hand, according to the second embodiment, a right end surface 22c of the lens array 22 that is disposed perpendicularly to the lower end surface 22a functions as a second surface to which the plurality of optical fibers 5 are attached. In other words, as shown in FIG. 12 and FIG. 14, a plurality of second lens faces 12 having a circular planar shape are formed on the upper end surface 2b. The number of second lens faces 12 is the same as the number of first lens faces 11. In a manner similar to that according to the first embodiment, the second lens faces 12 are formed on a lens formation surface 22c' that is a recessed plane formed in a predetermined area in the center of the right end surface 22c.

Furthermore, as shown in FIG. 12, a reflective surface 23 is formed in a recessing manner on an upper end surface 22b of the lens array 22. The reflective surface 23 is composed of a sloped plane that has a predetermined slope angle in relation to the lower end surface 22a and the right end surface 22c. The slope angle of the reflective surface 23 may be 45° in relation to both the lower end surface 22a and the right end surface 22c.

In a manner similar to that in the basic configuration according to the first embodiment, each first lens face 11 is formed into a convex lens face that increases the light beam diameter of the laser light La from the first lens face 11 side towards the second lens face 12 side, thereby increasing the spot diameter of the laser light La on the second lens face 12 to be larger than the spot diameter of the laser light La on the first lens face 11.

In the above-described configuration according to the second embodiment, as shown in FIG. 12, the laser light La of each light-emitting element 7 that is emitted upwards from each light-emitting element 7 is incident on each first lens face 11. As a result of the face shape of each first lens face 11, each first lens face 11 converges the laser light La of each light-emitting element 7 with a weaker refractive power than that for collimation. Therefore, the light beam diameter of the laser light La of each light-emitting element 7 is increased from the first lens face 11 side towards the second lens face 12 side. After the laser light La of each light-emitting element 7 is projected with a large spot diameter within the effective diameter of each second lens face 12, the laser light La is then emitted from each second lens face 12 towards the end face 5a of each optical fiber 5. In the process, as shown in FIG. 12, the laser light La of each light-emitting element 7 that has been converged by each first lens face 11 is incident on the reflective surface 23 at an angle of incidence that is greater than the critical angle from below. The reflective surface 23 then totally reflects the incident laser light La of the light-emitting element 7 towards each second lens face 12.

According to the second embodiment, the effect foreign matter/scratches on the second lens face 12 has on coupling efficiency can be effectively reduced in a configuration suitable for extracting the laser light La emitted from the light-emitting elements 7 mounted on the substrate 6 from a direction parallel to the substrate 6 at the end faces 5a of the optical fibers 5.

According to the second embodiment, as shown in FIG. 12 to FIG. 14, a pin 14' is erected on the right end surface 22c side for mechanical positioning of the optical fibers 5. The pin 14' is inserted into a through hole or a bottomed-hole (not shown) provided on the connector 10 side, and is thereby used to position the optical fibers 5.

In a manner similar to that according to the first embodiment, according to the second embodiment as well, various variation examples such as those below may be applied to the basic configuration shown in FIG. 12 to FIG. 14.

First Variation Example

Figure 15:
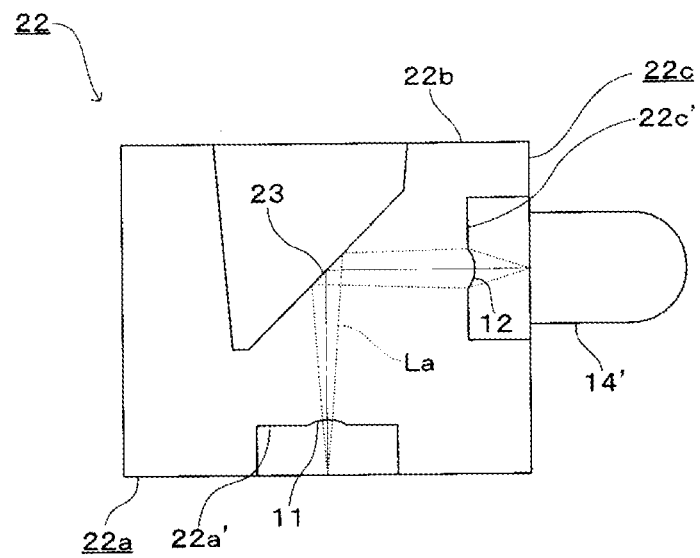
FIG. 15 A vertical cross-sectional view of a lens array in a first variation example according to the second embodiment FIG. 16 A vertical cross-sectional view of a lens array in a second variation example according to the second embodiment FIG. 17 A bottom view of FIG. 16

For example, as shown in FIG. 15, each first lens face 11 may be formed into a spherical or aspherical convex lens face.

Second Variation Example

Figure 16:
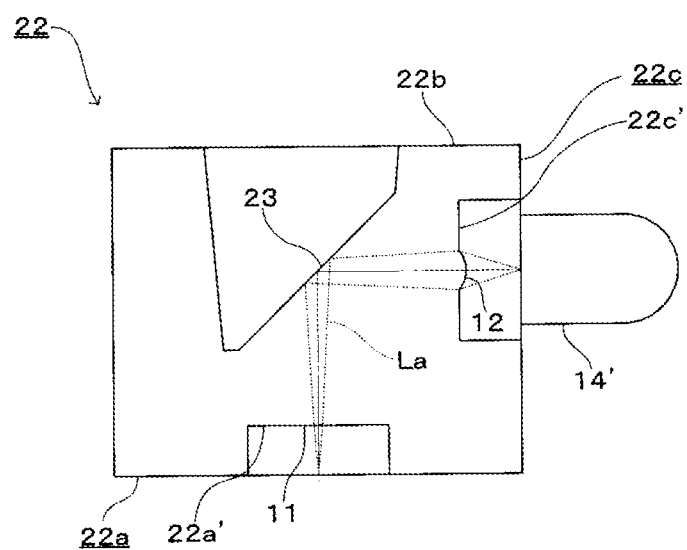
Figure 17:
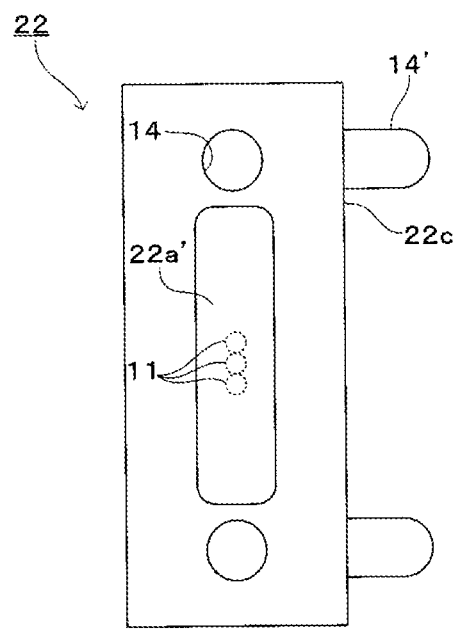

In addition, as shown in the vertical cross-sectional view in FIG. 16 and the bottom view in FIG. 17, each first lens face 11 may be formed into a planar lens face.

Third Variation Example

Figure 18:
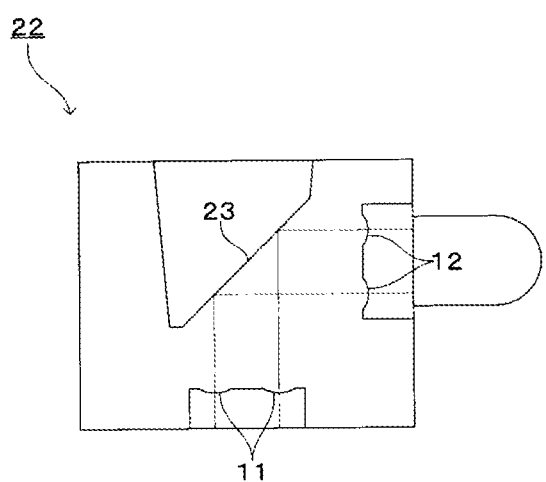
FIG. 18 A vertical cross-sectional view of a lens array in a third variation example according to the second embodiment FIG. 19 A bottom view of FIG. 18
Figure 19:
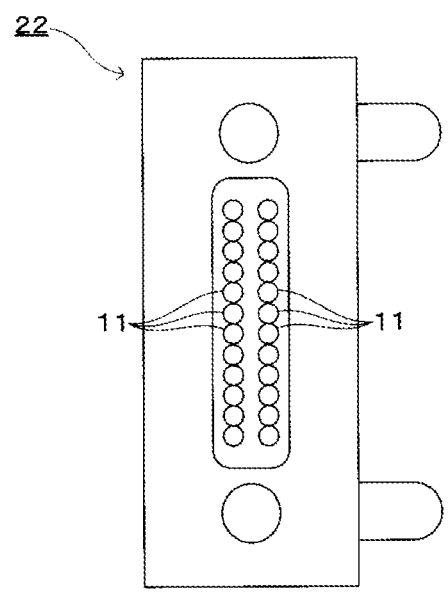
Figure 20:
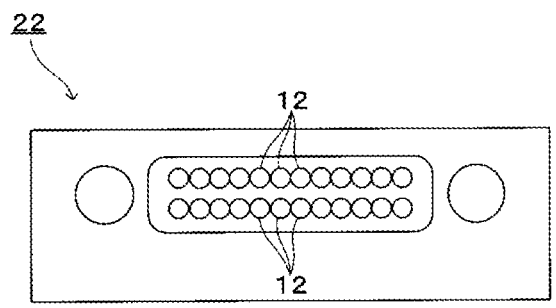
FIG. 20 A right-side view of FIG. 18

Furthermore, as shown in the vertical cross-sectional view in FIG. 18, the bottom view in FIG. 19, and the right-side view in FIG. 20, the number of first lens faces 11 and the number of second lens faces 12 in the basic configuration may be increased to two rows of 12 first lens faces 11 and two rows of 12 second lens faces 12 (24 each).

Fourth Variation Example

Figure 21:
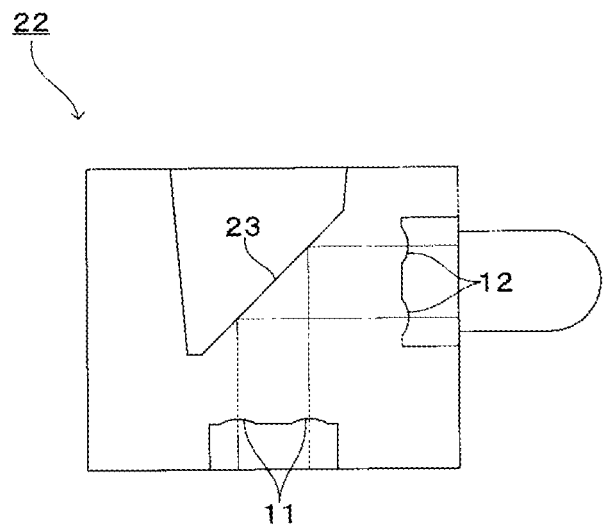
FIG. 21 A vertical cross-sectional view of a lens array in a fourth variation example according to the second embodiment FIG. 22 A vertical cross-sectional view of a lens array in a fifth variation example according to the second embodiment FIG. 23 An overall configuration diagram of a lens array and an optical module including the lens array according to a third embodiment of the present invention FIG. 24 A bottom view of the lens array shown in FIG. 23

Still further, as shown in FIG. 21, the number of first lens faces 11 and the number of second lens faces 12 in the first variation example may be increased to two rows of 12 first lens faces 11 and two rows of 12 second lens faces 12.

Fifth Variation Example

Figure 22:
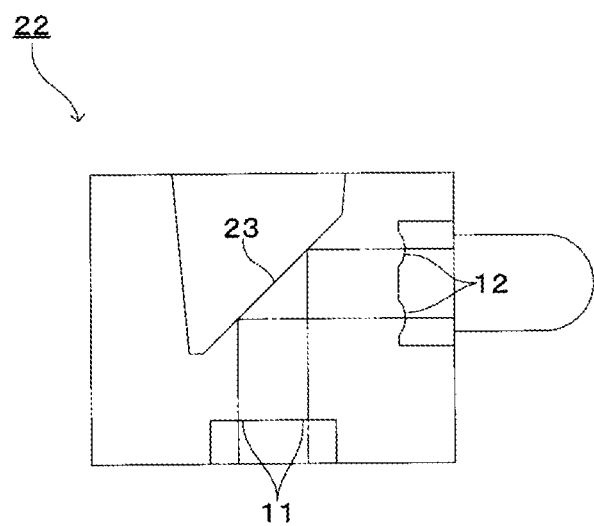

In addition, as shown in FIG. 22, the number of first lens faces 11 and the number of second lens faces 12 in the second variation example may be increased to two rows of 12 first lens faces 11 and two rows of 12 second lens faces 12.

Third Embodiment

Next, a lens array and an optical module including the lens array according to a third embodiment of the present invention will be described with reference to FIG. 23 to FIG. 26.

Sections of which the basic configuration is the same or similar to that according to the first embodiment are described using the same reference numbers.

Figure 23:
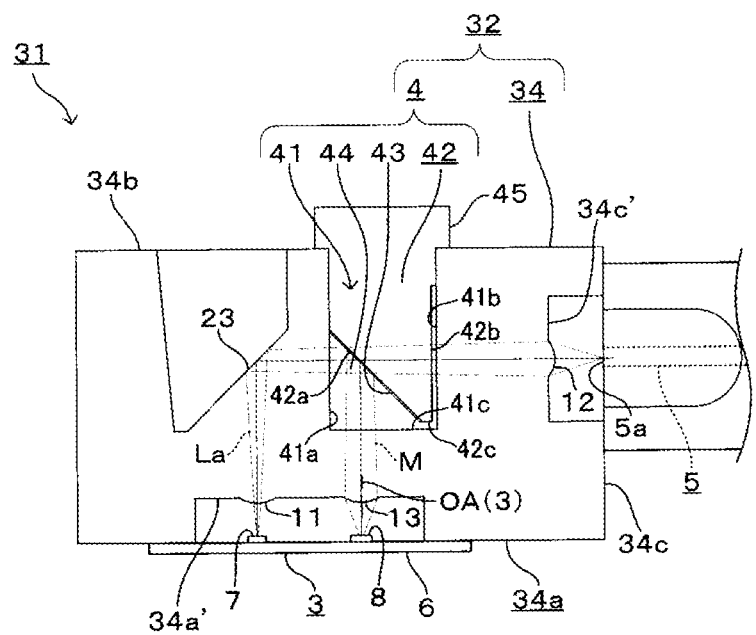
Figure 24:
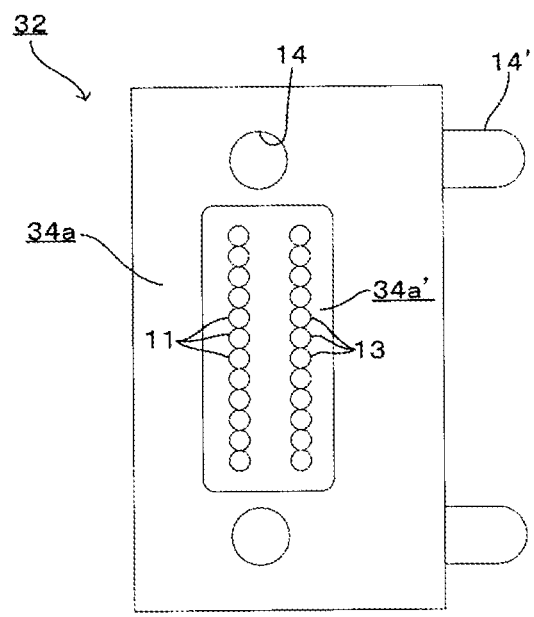
Figure 25:
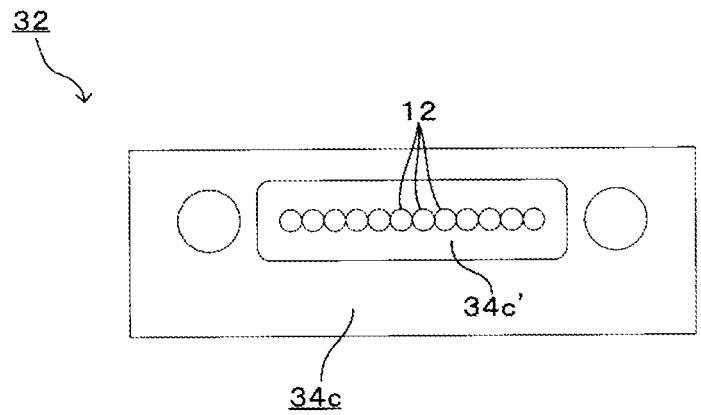
FIG. 25 A right-side view of the lens array shown in FIG. 23

FIG. 23 is an overall configuration diagram of an overview of a sub-assembly 31 according to the third embodiment, together with a vertical cross-sectional view of a lens array 32. In addition, FIG. 24 is a bottom view of the lens array 32 shown in FIG. 23. Furthermore, FIG. 25 is a right-side view of the lens array 32 shown in FIG. 23.

As shown in FIG. 23, the lens array 32 according to the third embodiment is disposed between the photoelectric conversion device 3 and the optical fibers 5 in a manner similar to that according to the first embodiment and the second embodiment. In addition, the basic configuration of the optical fibers 5 is similar to that according to the first embodiment and the second embodiment.

In a manner similar to that according to the second embodiment, the sub-assembly 31 according to the third embodiment is configured so that the laser light La emitted from each light-emitting element 7 mounted on the substrate 6 is extracted from a direction parallel to the substrate 6 at the end face 5a of each optical fiber 5.

However, unlike those according to the first embodiment and the second embodiment, the sub-assembly 31 according to the third embodiment is configured to enable feedback of some of the laser light La emitted from the light-emitting elements 7 and adjustment of the output of the laser light La (such as intensity and amount of light.

A specific configuration is as follows.

In other words, as shown in FIG. 23, the photoelectric conversion device 3 has a plurality of light-receiving elements 8 on the surface of the semiconductor substrate 6 on the lens array 32 side, in positions to the right side of the light-emitting elements 7 in FIG. 23. The light-receiving elements 8 receive monitor light M for monitoring the output of the laser light L emitted from the light-emitting elements 7. The number of light-receiving elements 8 is the same as the number of light-emitting elements 7. The light-receiving elements 8 may be photodetectors. Furthermore, electronic components (not shown), such as a control circuit that controls the output of the laser light La emitted from the light-emitting elements 7 based on the intensity and the amount of light of the monitor light M received by the light-receiving elements 8, are mounted on the surface of the semiconductor substrate 6 on the lens array 32 side. The electronic components are electrically connected to the light-emitting elements 7 and the light-receiving elements 8 by wiring.

In addition, as shown in FIG. 23, the lens array 32 has a lens array main body 34 that is composed of a light-transmitting material and has a substantially rectangular parallelepiped outer shape.

As shown in FIG. 23 and FIG. 24, the lens array main body 34 has a plurality (12 lens faces) of first lens faces 11 having a circular planar shape on a lower end surface 34a that serves as a first surface to which the photoelectric conversion device 3 is attached. The number of first lens faces 11 is the same as the number of light-emitting elements 7. In a manner similar to that according to the first embodiment, the first lens faces 11 are formed in an array along the light-emitting elements 7, on a lens formation surface 34a' that is a recessed plane formed in a predetermined area in the center of the lower end surface 34a.

In addition, as shown in FIG. 23 and FIG. 25, the lens array main body 34 has a plurality of second lens faces 12 on a right end surface 34c in FIG. 1 that serves as a second surface to which the optical fibers 5 are attached. The number of second lens faces 12 is the same as the number of first lens faces 11. In a manner similar to that according to the first embodiment, the second lens faces 12 are formed in an array on a lens formation surface 34c' that is a recessed plane formed in a predetermined area in the center of the right end surface 34c.

Furthermore, as shown in FIG. 23, in a manner similar to that according to the first embodiment, a reflective surface 23 is formed in a recessing manner on an upper end surface 34b of the lens array main body 34. The reflective surface 23 is composed of a sloped plane that has a predetermined slope angle in relation to the lower end surface 34a and the right end surface 34c. The slope angle of the reflective surface 23 may be 45° in relation to both the lower end surface 34a and the right end surface 34c.

Still further, as shown in FIG. 23 and FIG. 24, third lens faces 13 are formed in the lens formation area 34a' of the lower end surface 34a in a position near the right-hand side of the first lens faces 11. The number of third lens faces 13 is the same as the number of the light-receiving elements 8 (according to the third embodiment, the number of third lens faces 13 is also the same as the number of light-emitting elements 7, the number of optical fibers 5, the number of first lens faces 11, and the number of second lens faces 12). The third lens faces 13 are disposed in an array in a predetermined array direction corresponding with the light-receiving elements 8, or in other words, the same direction as the lens array direction. In addition, the third lens faces 13 are formed at the same pitch as the light-receiving elements 8. An optical axis OA(3) of each third lens face 13 preferably matches the center axis of a light-receiving surface of each light-receiving element 8 corresponding with each third lens face 13.

In addition, as shown in FIG. 23, an optical control unit 4 is disposed on the optical path between the reflective surface 23 and the second lens faces 12.

The optical control unit 4 is configured by a prism placement recessing section 41, a prism 42, a reflective/transmissive layer 43, and a filler material 44. The prism placement recessing section 41 is formed in a recessing manner on the upper end surface 34b of the lens array main body 34, in a position on the right of the reflective surface 23 that is also a position opposing the third lens faces 13. The prism 42 is placed within the recessing section 41. The reflective/transmissive layer 43 is disposed on the prism 42. The filler material 44 fills the area between the prism placement recessing section 41 and the prism 42.

More specifically, as shown in FIG. 23, a left inner surface 41a and a right inner surface 41b of the prism placement recessing section 41 are formed parallel to the lens formation surface 34c' of the right end surface 34c.

In addition, as shown in FIG. 23, the prism 42 has an incident surface 42a for the laser light La of each light-emitting element 7 in a position facing the left inner surface 41a of the prism placement recessing section 41 from the right side. As shown in FIG. 23, the incident surface 42a is formed into a sloped surface such that a lower end portion thereof is positioned further to the right side than an upper end portion thereof. The slope angle of the incident surface 42a is preferably 45° in the clockwise direction in FIG. 23, with reference to the lower end surface 34a. In addition, as shown in FIG. 23, the prism 42 has an outgoing surface 42b for the laser light La of each light-emitting element 7 in a position opposing the incident surface 42a from the right side. As shown in FIG. 23, the outgoing surface 42b opposes the right inner surface 41b of the prism placement recessing section 41 in a parallel manner, with a predetermined space therebetween. However, a portion of the right end surface of the prism 42 that is above the outgoing surface 42b may be placed in close contact with the right inner surface 41b of the prism placement recessing section 41. Furthermore, as shown in FIG. 23, a plate-shaped shoulder section 45 is integrally formed in an upper portion of the prism 42. The shoulder section 45 is provided for convenience, such as in handling the compact prism 42 (for placement into the prism placement recessing section 41) and to prevent infiltration of foreign matter (such as dust) into the prism placement recessing section 41. Furthermore, as shown in FIG. 23, a bottom surface 42c of the prism 42 connected between the lower end portion of the incident surface 42a and the lower end portion of the outgoing surface 42b is disposed in a position above an inner bottom surface 41c of the prism placement recessing section 41.

Furthermore, as shown in FIG. 23, the above-described reflective/transmissive layer 43 is on the incident surface 42a of the prism 42. The reflective/transmissive layer 43 may be formed by a single-layer film composed of a single metal, such as Ni, Cr, or Al. Alternatively, the reflective/transmissive layer 43 may be formed by a dielectric multilayer film obtained by a plurality of dielectrics having differing dielectric constants (such as $TiO_2$ and $SiO_2$) being alternately stacked. Moreover, the reflective/transmissive layer 43 may be formed by the above-described metal single-layer film or dielectric multilayer film being coated on the incident surface 42a. A known coating technique, such as Inconel deposition, can be used for coating. When a coating technique such as this is used, the reflective/transmissive layer 43 can be formed into a very thin thickness (such as 1 μm or less).

Still further, as shown in FIG. 23, the above-described filler material 44 completely fills the space between the left inner surface 41a of the prism placement recessing section 41 and the reflective/transmissive layer 43, and the space between the right inner surface 41b of the prism placement recessing section 41 and the outgoing surface 42b of the prism 42. In addition, the filler material 44 is composed of an adhesive, such as an acrylate adhesive or an epoxy adhesive serving as an ultraviolet-curable resin. The prism 42 is stably adhered within the prism placement recessing section 41.

In addition, the lens array main body 34, the prism 42, and the filler material 44 are formed such that the difference in refraction index therebetween is a predetermined value (such as 0.05) or less. For example, when the lens array main body 34 and the prism 42 are composed of Ultem (registered trademark), manufactured by SABIC, as the polyetherimide, the refractive index of the lens array main body 34 and the prism 42 is 1.64 (difference in refractive index 0.00) for light having a wavelength of 850 nm. As the corresponding filler material 44, LPC1101 manufactured by Mitsubishi Gas Chemical Company, Inc. can be used. The refractive index of LPC1101 is 1.66 for light having a wavelength of 850 nm, calculated based on the refractive index and the Abbe number in relation to the d line of values published by the manufacturer.

Furthermore, in a manner similar to that in the basic configuration according to the first embodiment, each lens face 11 is formed into a convex lens face that increases the light beam diameter of the laser light La from the first lens face 11 side towards the second lens face 12 side, thereby increasing the spot diameter of the laser light La on the second lens face 12 to be larger than the spot diameter of the laser light La on the first lens face 11.

In the above-described configuration according to the third embodiment, as shown in FIG. 23, first, the laser light La of each light-emitting element 7 that is emitted upwards from each light-emitting element 7 is incident on each first lens face 11. As a result of the face shape of each first lens face 11, each first lens face 11 converges the laser light La of each light-emitting element 7 with a weaker refractive power than that for collimation. Therefore, the light beam diameter of the laser light La of each light-emitting element 7 is increased from the first lens face 11 side towards the advancing direction.

Next, the laser light La that has been converged by each first lens face 11 is incident on the reflective surface 23 at an angle of incidence that is greater than the critical angle. The reflective surface 23 totally reflects the incident laser light La of each light-emitting element 7 towards the optical control unit 4.

Figure 26:
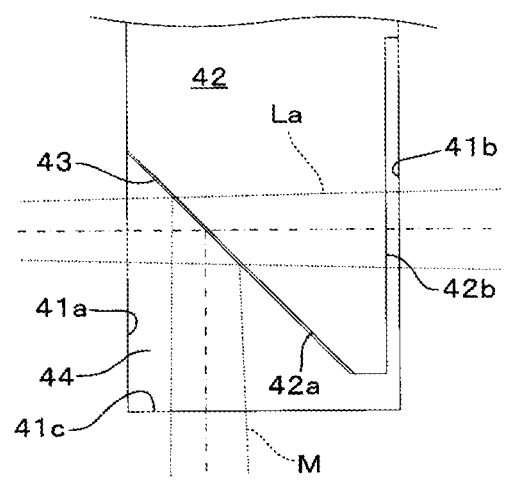
FIG. 26 An enlarged vertical cross-sectional view of an optical control unit

Next, the laser light La of each light-emitting element 7 that has been totally reflected by the reflective surface 23 is incident on the optical control unit 4, while increasing in light beam diameter as the laser light La advances. At this time, because the difference in refractive index between the lens array main body 34 and the filler material 44 is small, as shown in FIG. 26, refraction of the laser light La when entering the border between the left inner surface 41a of the and the filler material 44 in the prism placement recessing section 41 does not occur.

Next, the laser light La of each light-emitting element 7 that has advanced through the filler material 44 is incident on the reflective/transmissive layer 43, while increasing in light beam diameter as the laser light La advances. The reflective/transmissive layer 43 then reflects the laser light La of each light-emitting element 7 that has entered in this way towards the third lens face 13 side at a predetermined reflection factor. In addition, the reflective/transmissive layer 43 transmits the laser light La of each light-emitting element 7 that has entered in this way towards the incident surface 42a side of the prism 42. As the reflection factor and the transmission factor of the reflective/transmissive layer 43, desired values can be set depending on the material, thickness, and the like of the reflective/transmissive layer 43, to the extent that an amount of monitor light M sufficient for monitoring the output of the laser light La can be obtained. As shown in FIG. 23, during reflection or transmission such as this, the reflective/transmissive layer 43 reflects some (light amounting to the reflection factor) of the laser light La of each light-emitting element 7 that has entered the reflective/transmissive layer 43 as the monitor light M of each light-emitting element 7 corresponding with each light-emitting element 7, towards the third lens face 13 corresponding with each beam of monitor light M.

Furthermore, the monitor light M of each light-emitting element 7 reflected by the reflective/transmissive layer 43 in this way advances through the filler material 44 towards the third lens face 13 side, and subsequently enters the inner bottom surface 41c of the prism placement recessing section 41. Then, the monitor light M of each light-emitting element 7 that has entered the inner bottom surface 41c advances through the lens array main body 34, and is emitted from each third lens face 13 towards each light-receiving element 8 corresponding with each third lens face 13.

On the other hand, the laser light La of each light-emitting element 7 that has been transmitted by the reflective/transmissive layer 43 enters the incident surface 42a of the prism 42 immediately after transmittance and advances towards the second lens face 12 side on the optical path within the prism 42. In addition, the light beam diameter of the laser light La increases as the laser light La advances.

At this time, because the reflective/transmissive layer 43 is very thin, the refraction that occurs when the laser light La of each light-emitting element 7 is transmitted through the reflective/transmissive layer 43 is small enough to be ignored.

Next, the laser light La of each light-emitting element 7 that has advanced through the prism 42 is emitted outside of the prism 42 from the outgoing surface 42b of the prism 42.

The laser light La passes through the filler material 44 and enters the right inner surface 41b of the prism placement recessing section 41. At this time, because the difference in refractive index among the prism 42, the filler material 44, and the lens array main body 34 is small, as shown in FIG. 26, refraction and Fresnel reflection of the laser light La of each light-emitting element 7 does not occur.

Next, the laser light La of each light-emitting element 7 advances towards the second lens face 12 side on the optical path within the lens array main body 34 subsequent to the right inner surface 41b. In addition, the light beam diameter of the laser light La increases as the laser light La advances.

After the laser light La of each light-emitting element 7 is projected with a large spot diameter within the effective diameter of each second lens face 12, the laser light La is then emitted from each second lens face 12 towards the end face 5a of each optical fiber 5.

According to the third embodiment, the effect foreign matter/scratches on the second lens face 12 has on coupling efficiency can be effectively reduced in a configuration suitable for adjusting the output of the laser light La of the light-emitting elements 7.

The variation examples applied to the first embodiment and the second embodiment can also be applied accordingly to the third embodiment.

Example 1

Next, in Example 1, simulation was conducted regarding the effect foreign matter on the second lens face 12 has on coupling efficiency between a VCSEL and optical fibers, while changing a radius of curvature (center radius of curvature) R of the first lens faces 11.

In the simulation, a type of lens array such as that according to the first embodiment in which the second lens faces 12 are disposed behind the first lens faces 11 was used.

In addition, the VCSEL has $\phi 0.01$ mm, NA 0.15 (where the light beam diameter is the diameter of a peripheral edge portion in which the intensity decreases to $1/e^2$ of the maximum intensity), and a usage wavelength of 850 nm. The optical fiber 5 has $\phi 0.05$ mm and NA 0.20.

Furthermore, the distance between the VCSEL and the first lens faces 11 is 0.14 mm.

Figure 27:
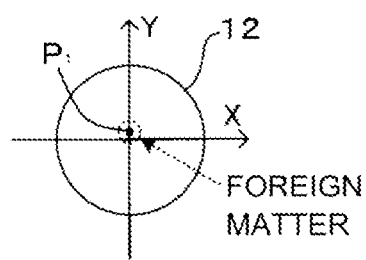
FIG. 27 An explanatory diagram for explaining a simulation in Example 1

Still further, in the simulation, as shown in FIG. 27, foreign matter that is $\phi 0.02$ mm in size is assumed to be present in a position $P_1$ (x=0.00 mm, y=0.015 mm) that is 0.015 mm from the center (x=0.00 mm, y=0.00 mm) of the second lens 12.

In addition, a defocus position on the optical fiber 5 side is a position at which the coupling efficiency is optimal when no foreign matter is present.

The results of the simulation conducted under the above-described conditions are shown in Table 1, below, and FIG. 28 and FIG. 29.

TABLE 1

|  |  | No foreign matter | | Foreign matter present | |
|---|---|---|---|---|---|
| R(mm) | Beam shape | Coupling efficiency (dB) | Transmission factor (%) | Coupling efficiency (dB) | Transmission factor (%) |
| 0.08 | Collimated light | −0.52 | 88.7 | −1.32 | 73.8 |

TABLE 1-continued

|  |  | No foreign matter | | Foreign matter present | |
|---|---|---|---|---|---|
| R(mm) | Beam shape | Coupling efficiency (dB) | Transmission factor (%) | Coupling efficiency (dB) | Transmission factor (%) |
| 0.10 | Spread converged light | −0.52 | 88.6 | −1.15 | 76.8 |
| 0.12 | Spread converged light | −0.54 | 88.4 | −1.06 | 78.3 |
| 0.14 | Spread converged light | −0.52 | 88.6 | −0.97 | 79.9 |

Figure 28:
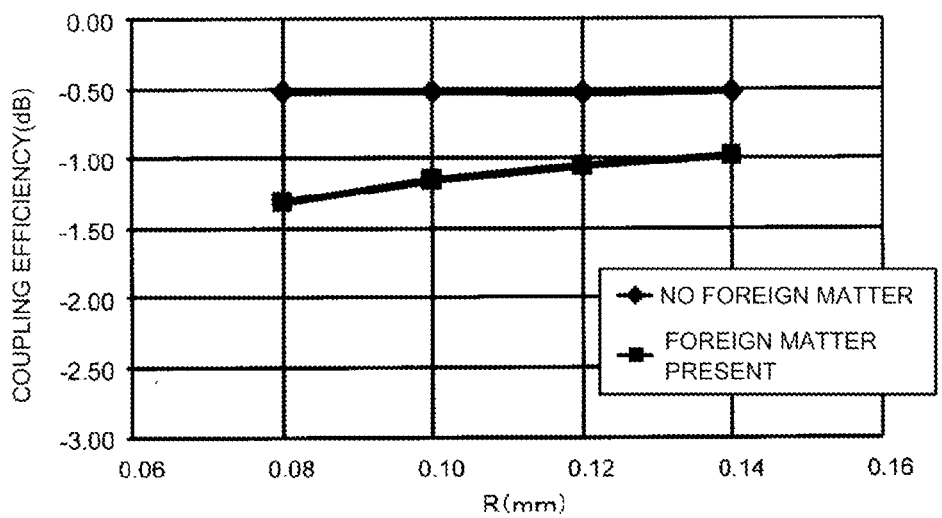
FIG. 28 A coupling efficiency characteristics graph indicating the results of the simulation in Example 1

However, in FIG. 28, the horizontal axis indicates the radius of curvature R of the first lens face 11. The vertical axis indicates the coupling efficiency. In FIG. 29, the horizontal axis indicates the radius of curvature R of the first lens face 11. The vertical axis indicates the transmission factor.

Figure 29:
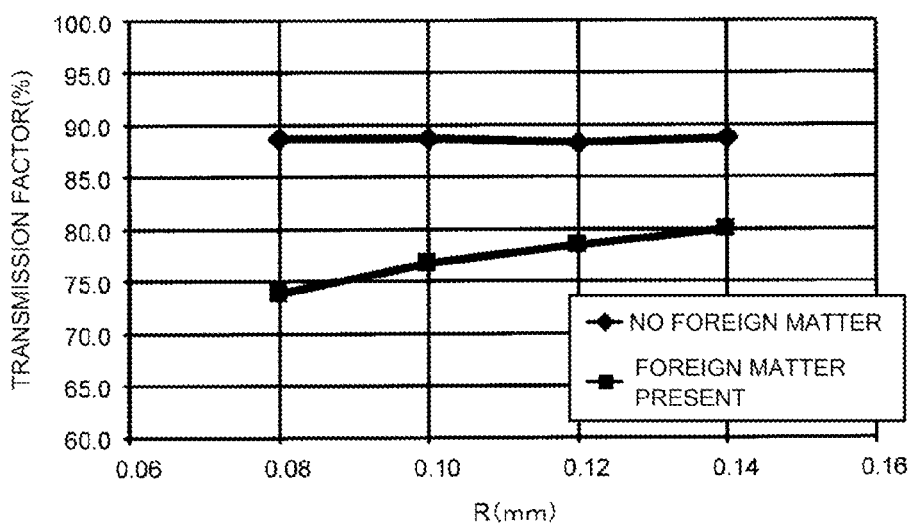
FIG. 29 A transmission factor characteristics graph indicating the results of the simulation in Example 1

As shown in Table 1, FIG. 28, and FIG. 29, when the radius of curvature of the first lens face 11 is 0.08 mm, the light beam obtained by the first lens face 11 is a collimated light that departs from the scope of the present invention. The transmission factor of the laser light La at the second lens face 12 and the coupling efficiency of the laser light La with the optical fiber 5 are values that deteriorate the most during the simulation, compared to when foreign matter is not present. A reason for this is thought to be that, in the collimated light, the area occupancy of foreign matter in relation to the light spot on the second lens face 12 is high.

On the other hand, when the radius of curvature is 0.10 mm, 0.12 mm, or 0.14 mm, the light beam obtained by the first lens surface 11 is a converged light that spreads wider than the collimated light, or in other words, the light intended in the present invention. The transmission factor of the laser light La at the second lens face 12 and the coupling efficiency of the laser light La with the optical fiber 5 are higher than those of the collimated light (less deterioration in terms of comparison with when foreign matter is not present). In particular, when the radius of curvature is 0.14 mm, the transmission factor and the coupling efficiency are the highest. A reason for this is thought to be that, because a converged light that is spread wider than the collimated light is obtained, the area occupancy of foreign matter in relation to the light spot on the second lens face 12 can be sufficiently reduced.

Example 2

Next, in Example 2, simulation similar to that in Example 1 was conducted on the type of lens array according to the second embodiment that includes the reflective surface 23.

In the simulation, the distance between the VCSEL and the first lens faces 11 is 0.28 mm.

Figure 30:
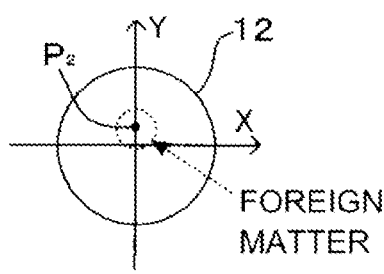
FIG. 30 An explanatory diagram for explaining a simulation in Example 2

In addition, in the simulation, as shown in FIG. 30, foreign matter that is ϕ0.04 mm in size is assumed to be present in a position P$_2$ (x=0.00 mm, y=0.03 mm) that is 0.03 mm from the center (x=0.00 mm, y=0.00 mm) of the second lens 12.

Other simulation conditions are similar to those in Example 1.

The results of the simulation are shown in Table 2, below, and FIG. 31 and FIG. 32.

TABLE 2

|  |  | No foreign matter | | Foreign matter present | |
|---|---|---|---|---|---|
| R(mm) | Beam shape | Coupling efficiency (dB) | Transmission factor (%) | Coupling efficiency (dB) | Transmission factor (%) |
| 0.17 | Collimated light | −0.53 | 88.5 | −1.36 | 73.2 |
| 0.19 | Spread converged light | −0.53 | 88.5 | −1.29 | 74.3 |
| 0.21 | Spread converged light | −0.53 | 88.5 | −1.12 | 77.3 |
| 0.23 | Spread converged light | −0.54 | 88.3 | −1.00 | 79.4 |

Figure 31:
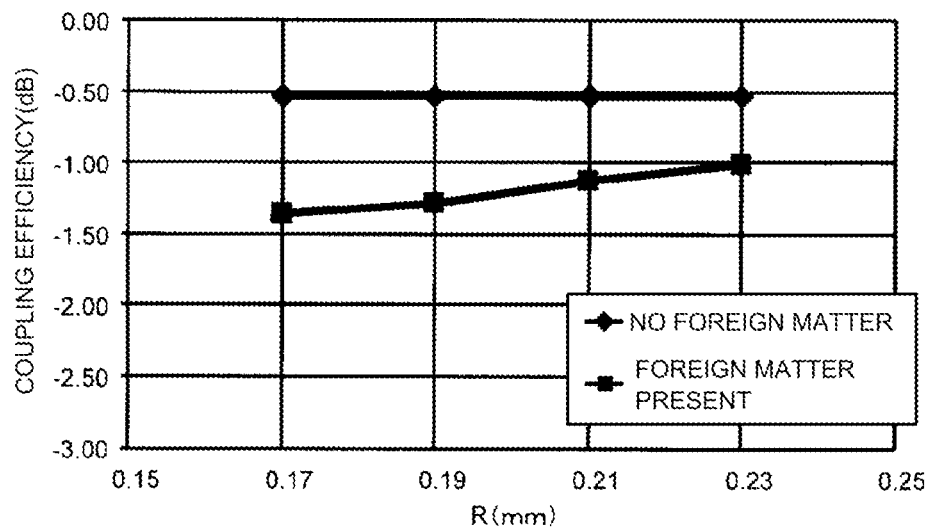
FIG. 31 A coupling efficiency characteristics graph indicating the results of the simulation in Example 2
Figure 32:
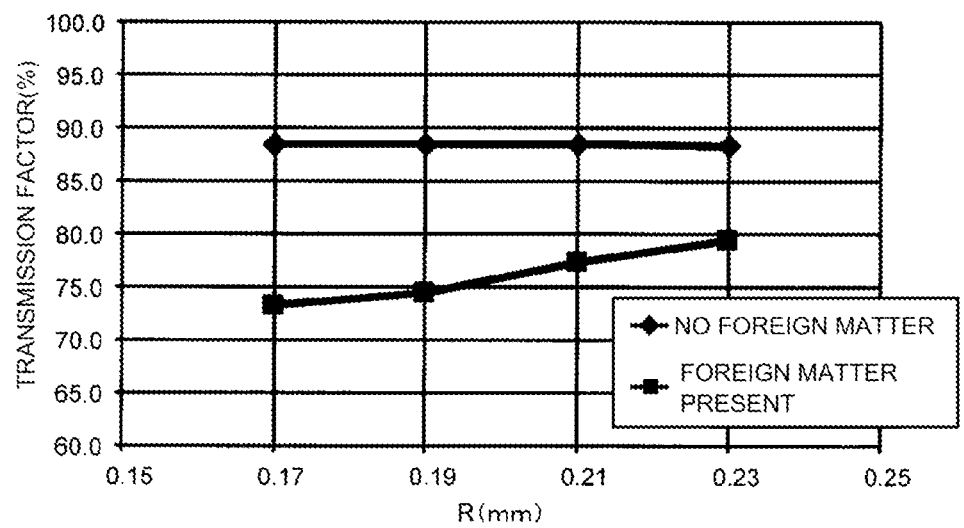
FIG. 32 A transmission factor characteristics graph indicating the results of the simulation in Example 2

As shown in Table 2, FIG. 31, and FIG. 32, when the radius of curvature of the first lens face 11 is 0.17 mm, the light beam obtained by the first lens face 11 is a collimated light that departs from the scope of the present invention. The transmission factor of the laser light La at the second lens face 12 and the coupling efficiency of the laser light La with the optical fiber 5 are values that deteriorate the most during the simulation.

On the other hand, when the radius of curvature is 0.19 mm, 0.21 mm, or 0.23 mm, the light beam obtained by the first lens surface 11 is a converged light that spreads wider than the collimated light, or in other words, the light intended in the present invention. The transmission factor of the laser light La at the second lens face 12 and the coupling efficiency of the laser light La with the optical fiber 5 are higher than those of the collimated light Such tendencies are also likely to be similar when the lens array according to the third embodiment is used.

The present invention is not limited to the above-described embodiments. Various modifications can be made to an extent that the features of the present invention are not compromised.

For example, the above-described embodiments are applied to optical transmission as optical communication. However, the present invention can also be effectively applied to optical reception. When the present invention is applied to optical reception, a configuration may be used in which light-receiving elements, such as photodetectors, are disposed instead of the light-emitting elements 7 in the positions of the light-emitting elements 7, and laser light for reception is emitted from the end faces 5a of the optical fibers 5 towards the second lens faces 12. In this instance, the second lens faces 12 can be formed into convex lens faces that converge the laser light emitted from the end faces 5a of the optical fibers with a stronger refractive power than that for collimation. As a result, even in optical reception, the light spot diameter on the second lens face 12 can be made larger than the light spot diameter on the first lens face 11, and the area occupancy of foreign matter/scratches in relation to the light spot on the second lens face can be reduced. Therefore, the effect foreign matter/scratches have on coupling efficiency with the light-receiving element can be reduced.

In addition, the present invention may be applied to optical transmission bodies other than the optical fibers 5, such as an optical waveguide.

EXPLANATIONS OF LETTERS OR NUMERALS 1 sub-assembly
2 lens array
3 photoelectric conversion device
5 optical fiber
7 light-emitting element
11 first lens face
12 second lens face

The invention claimed is:

1. A lens array that is disposed between a photoelectric conversion device and an optical transmission body, the photoelectric conversion device in which a plurality of photoelectric conversion elements are disposed in an array, the lens array capable of optically coupling the plurality of photoelectric conversion elements and the optical transmission body, the lens array comprising:
    a plurality of first lens faces that are disposed on a first surface of a lens array main body on the photoelectric conversion device side, such as to be arrayed in a predetermined array direction corresponding with the plurality of photoelectric conversion elements, and through which light of each photoelectric conversion element that couples the plurality of photoelectric conversion elements and the optical transmission body passes; and
    a plurality of second lens faces that are disposed on a second surface of the lens array main body on the optical transmission body side, such as to be arrayed along the array direction, and through which the light passes, wherein
    each first lens face or each second lens face is formed having a face shape that increases the light beam diameter of the light from the first lens face side towards the second lens face side, thereby increasing a spot diameter of the light on each second lens face to be larger than a spot diameter of the light on each first lens face, and
    each first lens face is formed into a concave lens face that disperses light it receives from a respective photoelectric conversion element.

2. The lens array according to claim 1, wherein:
    each photoelectric conversion element is a light-emitting element.

3. The lens array according to claim 1, wherein:
    the second surface is disposed perpendicularly to the first surface; and
    a reflective surface is disposed between the first lens faces and the second lens faces, the reflective surface reflecting the light that has entered from either the first lens face side or the second lens face side towards the other of the first lens face side or the second lens face side.

4. The lens array according to claim 3, wherein:
    the photoelectric conversion device is that in which at least one light-receiving element is disposed as the photoelectric conversion element, the light-receiving element receiving monitor light for monitoring the light emitted from at least one of the plurality of photoelectric conversion elements; and
    the lens array further includes
    at least one third lens face that is disposed on the first surface and emits the monitor light that has entered from the inner side of the lens array main body towards the light-receiving element, and
    an optical control unit that is disposed on an optical path between the reflective surface and the second lens faces in the lens array main body, on which the light of each photoelectric conversion element that has been reflected by the reflective surface towards the second lens face side is incident, and that performs control such that the incident light of each photoelectric conversion element is reflected at a predetermined reflection factor and advanced towards the third lens face side, and transmitted at a predetermined transmission factor and advanced towards the second lens face side, and at this time, reflects the light of at least one of the plurality of photoelectric conversion elements as the monitor light.

5. The lens array according to claim 1, wherein
    the second surface is disposed opposing the first surface; and
    the optical axis of each first lens face is collinear with the optical axis of a respective second lens face.

6. An optical module comprising:
    the lens array according to claim 1; and
    a photoelectric conversion device in which a plurality of photoelectric conversion elements are disposed in an array.

7. The lens array according to claim 2, wherein:
    the second surface is disposed perpendicularly to the first surface; and
    a reflective surface is disposed between the first lens faces and the second lens faces, the reflective surface reflecting the light that has entered from either the first lens face side or the second lens face side towards the other of the first lens face side or the second lens face side.

8. The lens array according to claim 7, wherein:
    the photoelectric conversion device is that in which at least one light-receiving element is disposed as the photoelectric conversion element, the light-receiving element receiving monitor light for monitoring the light emitted from at least one of the plurality of light-emitting elements; and
    the lens array further includes
    at least one third lens face that is disposed on the first surface and emits the monitor light that has entered from the inner side of the lens array main body towards the light-receiving element, and
    an optical control unit that is disposed on an optical path between the reflective surface and the second lens faces in the lens array main body, on which the light of each light-emitting element that has been reflected by the reflective surface towards the second lens face side is incident, and that performs control such that the incident light of each light-emitting element is reflected at a predetermined reflection factor and advanced towards the third lens face side, and transmitted at a predetermined transmission factor and advanced towards the second lens face side, and at this time, reflects the light of at least one of the plurality of light-emitting elements as the monitor light.

9. The lens array according to claim 2, wherein
    the second surface is disposed opposing the first surface; and
    the optical axis of each first lens face is collinear with the optical axis of a respective second lens face.

* * * * *